3,290,399
PROCESS FOR PREPARING VINYL CHLORIDE
Frédéric François Albert Braconier, Plainevaux, and Pierre-Jean Leroux, Brussels, Belgium, assignors to Societe Belge de l'Azote et des Produits Chimiques du Marly, Liege, Belgium
No Drawing. Filed June 11, 1962, Ser. No. 201,332
10 Claims. (Cl. 260—656)

This invention relates to the preparation of vinyl chloride by pyrolysis reaction of dichloroethane and, more particularly, to a catalytic pyrolysis process utilizing as the catalyst crystalline forms of carbon such as graphite for achieving enhanced reaction efficiency and purity and yield of product.

As well understood, the pyrolysis or thermal decomposition of dichloroethane provides a convenient and economical method for the preparation of vinyl chloride, which material has wide utility in various chemical syntheses. Particularly for such uses, however, a vinyl chloride product of high purity may be desired, while the production yield or efficiency of the pyrolysis production may also be desired to be as high as possible. Both high purity and high yield, however, may be disadvantageously affected by secondary decomposition reactions of dichloroethane during pyrolysis into such products as ethylene, carbon black, and other useless or waste carbonaceous materials. Indeed, if it is attempted to increase the efficiency and production yield of such a pyrolysis process by increasing the reaction temperature, etc., it may be found that such secondary decompositions are also disadvantageously increased.

Some enhancement of the desired dichloroethane decomposition may be achieved by carrying out the pyrolysis reaction over or in contact with a decomposition catalyst. In British Patent No. 823,285, for example, there is disclosed a process for preparing vinyl chloride from dichloroethane by thermal decomposition in vapor phase where the pyrolysis is conducted in the presence of dry and ash-free activated carbon as a contact pyrolysis catalyst. In that case, the catalyst is prepared by washing activated carbon with 2 N nitric acid at a temperature of from 50° C. to 75° C. and then washing it with water, and thereafter drying the material to an ash-free state which is also substantially free of metallic salts, particularly iron salts, which may catalyze the formation of undesired secondary or parasitic products.

Even with such catalysts, however, it may be found that the pyrolysis zone (or at least wall portions thereof) may have to be maintained at an undesirably or inefficiently high temperature in order to achieve a desired high yield. Similarly, the desirably high conversion rate attributable to such catalysts may have a tendency to decrease considerably after some hours of use in a manner not desired from the standpoint of continuous commercial operation. That is, some catalytic materials having an essentially porous character (such as coke and/or activated carbon on a porous carrier) do possess the substantial advantage of permitting operation so as to minimize undesired secondary decomposition of the dichloroethane, especially during the first few hours of continued reaction, so as to permit desirably high conversion rates into vinyl chloride. With such porous materials, however, it may be found that the high conversion rates diminish after a certain length of time (possibly due to deposition of pyrolytic carbon black into the pores of the porous contact material) so that the initial advantages diminish in long-term commercial runs to an undesired extent.

According to this invention, by contrast, an enhanced yield of vinyl chloride of high purity is formed by pyrolysis or thermal decomposition of dichloroethane in the vapor phase and at somewhat reduced temperatures with a minimum production of undesired secondary pyrolysis products by conducting the thermal dehydrochlorination reaction in the presence of an essentially crystalline carbon material such as graphite as the pyrolysis catalyst, with such graphite preferably being in the form of solid bars or chunks.

With the foregoing and other objects in view, this invention will now be described in more detail, and other objects and advantages thereof will be apparent from the following description and the appended claims.

The features and teachings in accordance herewith are applicable to the pyrolysis or thermal dehydrochlorination of both 1,2-dichloroethane and 1,1-dichloroethane in the enhanced production of vinyl chloride therefrom with desirably enhanced or efficient conversion rates of at least about 30% per pass of dichloroethane through the pyrolysis zone to give yields of above 99% utilizing apparatus and operative techniques generally of the character disclosed in the above noted British patent, but with catalytic materials and lower temperature operating conditions as noted herein, and satisfactory results are achieved in accordance herewith to produce a vinyl chloride product having a purity of around 99.9% when separated from the other components of the pyrolysis gas mixture as noted below. As will be understood, one resultant of the thermal decomposition is hydrogen chloride, which is preferably recycled through the pyrolysis zone after separation from the mixture of pyrolysis gases to achieve maximum results in accordance herewith.

As noted, a crystalline or essentially non-porous form of catalyst is used here, instead of porous materials or powdered catalysts alone or carried on porous materials, and, as particularly illustrative of preferred catalytic materials with which satisfactory results are achieved herewith may be noted crystalline carbon such as graphite in the form of granules or bars or chunks. Among these forms, the use of graphite in the form of bars is preferred for a number of reasons, among which may be noted the fact that a mass of graphite granules may have a tendency to squeeze together or densify undesirably if there is a substantial or increasing pressure drop through the pyrolysis zone and, particularly, when the pyrolysis reaction in conducted within an elongated heated tube. Furthermore, if graphite bars are used and disposed lengthwise in the pyrolysis tube so that the various bars actually contact each other, the general uniformity of heating and thermal exchange within and along the tube is enhanced with the minimizing or elimination of local areas of overheating or non-uniform temperature changes productive of undesired secondary decomposition reactions.

Furthermore, when using the crystalline catalyst or graphite bodies in accordance herewith, desirably high conversion rates and yields have been obtained, particularly in apparatus where the pyrolysis zone is an elongated tube heated from outside, under conditions where the wall temperature of the pyrolysis tube may be substantially less than that required for comparable results when utilizing other porous catalytic materials or the activated carbon of the above noted British patent. Although such temperature differences may vary, as will be understood, depending upon a number of factors including particularly the diameter of the pyrolysis tube, the flow rate of gases therethrough, and the quantity and/or available surface area of the catalyst materials, satisfactory results have been achieved herewith under operating conditions where the wall temperature of the pyrolysis reactor was from 20° C. to more than 150° C. less than that required or employed with such prior types of carbon catalysts (a temperature range of 350°–600° C. being recited in the above noted British patent), and with, of course, a concomitant diminution of undesired secondary reactions and increase in conversion rate and production yields. In considering the foregoing, however, it must be empasized that the particular advantages of this invention are especially applicable to long commercial runs. That is, during the first few hours of a pyrolysis reaction, the catalytic materials and operating conditions here may not necessarily achieve conversion rates high than those achieved with prior processes, but with continued operation after the first few hours, the conversion rates in accordance herewith remain well above those obtainable with prior processes where the activity of the catalyst and the conversion rates tend to diminish after a certain time of continuous operation.

As further and generally illustrative of this invention and apparatus and operations in accordance therewith, one may note the following examples with which satisfactory results have been achieved in accordance herewith:

Example I

Vaporized 1,2-dichloroethane was introduced at the flow rate of 1 kg./hr. into a steel pyrolysis tube having an internal diameter of 18 mm. and a length of 2.40 m. and containing 500 cc. of graphite in the form of particles of about 3–5 mm. in size. The tube was heated from outside to maintain an average temperature of the walls thereof of about 460° C., and the operating pressure within the reaction zone was about 8 kg./sq. cm. A conversion rate for pyrolysis of dichloroethane into vinyl chloride of about 30% per pass through the pyrolysis zone was achieved, giving a yield of vinyl chloride of about 99.5%, calculated on the converted dichloroethane.

By contrast with a process as set forth in the above noted British patent, a temperature of 476° C. was required to be maintained on the wall of the pyrolysis tube, all other conditions and apparatus remaining the same except for the utilization of the prior art activated carbon as a catalyst, in order to obtain the same conversion rate of 30% per pass, but the total yield of vinyl chloride was only 99.2%.

Example II

Vaporized 1,2-dichloroethane was introduced, at a flow rate of 5 kg./hr. into a somewhat larger steel pyrolysis tube having an internal diameter of 39 mm. and a length of 2.40 m. and containing, in accordance herewith, five graphite bars having a diameter of 13 mm. and disposed lengthwise of the pyrolysis tube with the adjacent ends of the bars in contact with each other. The tube was heated to achieve an average temperature on the wall of about 455° C., and the internal pressure was about 8 kg./sq. cm. A conversion rate of 30% per pass of vinyl chloride was obtained, with an overall yield of 99.5%. As will be noted in connection with the foregoing data, the temperatures on the walls of the pyrolysis tubes (and the lower temperatures permissible in accordance herewith) are quite significant from the standpoint of optimum continuous operation and enhanced efficiency because of the tendency of the pyrolysis gases to decompose particularly into carbon black, tars, and other waste products on or adjacent the pyrolysis tube walls where the temperatures are highest.

Example III

In this example the pyrolysis tube was made of a steel known as "Chromesco" steel and contained about 0.75% manganese, 0.55% chromium, and 0.55% molybdenum, with the tube having an internal diameter of 38 mm., an external diameter of 44 mm., and a length of 2.50 m. Within the pyrolysis tube were placed four cylindrical graphite bars (known as type 206H of the Societe le Carbone), each having a diameter of 13 mm. and a length substantially equal to that of the steel tube. The four bars were placed in the tube lengthwise, with each bar contacting all others along the lengths thereof, and the tube was heated by hot gases circulating through an external heating jacket, with the reaction temperature therein being controlled by a thermocouple supported at the axis of the pyrolysis tube.

Vaporized 1,2-dichloroethane was introduced into such pyrolysis apparatus at a flow rate of from 3.5 to 5 kg./hr., and the reaction conditions in the tube were maintained at a temperature of about 465° C. and a pressure of about 14 atm. Under these operating conditions, a dichloroethane conversion rate of about 35% per pass was obtained, while the yield of vinyl chloride was 99.5% and of hydrogen chloride was 100%, both being calculated on the converted dichloroethane.

As will be understood, the mixture of decomposition pyrolysis gases exiting from the pyrolysis zones in accordance herewith contain primarily the desired vinyl chloride product, hydrogen chloride gas from the pyrolysis reaction, and unconverted dichloroethane, along with, of course, minor amounts of secondary reaction products. The desired vinyl chloride product is separated from the other components of the mixture of pyrolysis gases in known manner, with the unconverted dichloroethane and, preferably, the hydrogen chloride being recycled through the pyrolysis zone with additional dichloroethane being treated. As illustrative, however, of a satisfactory separation or purification technique, the gas mixture produced from the reaction described in Example III was cooled down to a temperature of about 100° C. and thereafter subjected to a two-stage distillation under pressure. That is, the gas mixture was introduced about mid-way of a distillation column maintained at a pressure of about 13 atm., while the foot of the column is maintained at a temperature of about 125° C., in order to free first of all the hydrogen chloride from the gas mixture. Thereafter the mixture of dichloroethane and vinyl chloride in solution therein was introduced about mid-way into a second distillation column in which was maintained a pressure of about 6 atm. and a temperature at the bottom of about 140° C. for final recovery of the vinyl chloride product, in this particular example at a purity of 99.91%. As noted, both the unconverted dichloroethane and the hydrogen chloride were recycled into the pyrolysis tube for subsequent reaction and ultimate conversion of the dichloroethane.

Although the foregoing specific examples have considered 1,2-dichloroethane as an illustrative material for pyrolysis in accordance herewith, it is to be understood that this invention is also applicable to 1,1-dichloroethane for pyrolysis into vinyl chloride, as well as to other thermal dehydrochlorination reactions, as well as with operations wherein the original dichloroethane material may be diluted or admixed with other inert gaseous materials. Generally with the dichloroethanes, satisfactory results are achieved in accordance herewith at elevated pyrolysis temperatures but not exceeding about 600° C. and at reaction pressures less than about 35 to 40 atm. Most economically advantageous or optimum results have been achieved herewith for the dehydrochloronation of 1,2-dichloroethane, however, at temperatures of about 450° C., which are preferred, to provide conversion rates of dichloroethane at about 30% to 35% per pass, with the unconverted dichloroethane being ultimately pyrolyzed in a recycling step.

Accordingly, there is provided in accordance with this invention a pyrolysis or thermal dehydchlorination process for the production of vinyl chloride from dichloroethane with enhanced efficiency and for prolonged continuous commercial operation, with a minimum of secondary wasteful reactions and maximum yields, with provision for operating at somewhat reduced operating temperatures and with catalytic materials providing a prolonged and uniform level of conversion rate and efficiency, while also providing for more uniform heating conditions within the pyrolysis zone. The particularly preferred catalytic materials in accordance herewith are readily obtainable commercially, and are provided in forms or configurations which are readily handled in commercial processing and easily placed and replaced in the apparatus where they contribute to the general uniformity of operating conditions as well as retaining a high level of activity or reactivity despite prolonged use and reuse under commercial conditions.

While the methods and materials and techniques herein described constitute preferred embodiments of the invention, it is to be understood that the invention is not limited to these precise methods and materials and techniques, and that changes may be made therein without departing from the scope of the invention which is defined in the appended claims.

What is claimed is:

1. In a process for the preparation of vinyl chloride by pyrolysis and thermal dehydrochlorination of dichloroethane in a heated pyrolysis zone, the steps which comprise introducing a reactant stream consisting essentially of dichloroethane in vapor phase into said pyrolysis zone, disposing a solid activating catalyst consisting essentially of graphite in substantially non-porous form in said pyrolysis zone, passing said dichloroethane through said pyrolysis zone and in contact with said non-porous catalyst therein, heating said pyrolysis zone and said catalyst and said dichloroethane therein to a temperature within the range of about 330°–600° C. effecting pyrolysis of said dichloroethane into a gas mixture including vinyl chloride and hydrogen chloride, collecting said pyrolysis gas mixture from said pyrolysis zone, and separating vinyl chloride as a product therefrom.

2. The process as recited in claim 1 in which said non-porous graphite catalyst is in the form of elongated bars.

3. The process as recited in claim 1 in which said non-porous graphite catalyst is in the form of chunks.

4. The process as recited in claim 1 in which said non-porous catalyst is in the form of a plurality of elongated solid bars of graphite, and in which said graphite bars are disposed in said pyrolysis zone in heat conducting contact with each other.

5. The process as recited in claim 1 in which said pyrolysis zone is generally defined by a tubular metal wall.

6. The process as recited in claim 1 in which said heating of said pyrolysis zone and said catalyst and said dichloroethane therein is provided from the outside of said zone into the interior thereof.

7. The process as recited in claim 6 in which the temperature of said dehydrochlorination reaction in said pyrolysis zone is maintained at about 450° C.

8. The process as recited in claim 1 in which operating pressure for said dehydrochlorination reaction in said pyrolysis zone is maintained within the range of from atmospheric up to about 40 atmospheres.

9. The process as recited in claim 8 in which said operating pressure is maintained within the range of about 5 to 15 kg./cm.$^2$.

10. In a process for the preparation of vinyl chloride by pyrolysis and thermal dehydrochlorination of dichloroethane in a heated pyrolysis zone, the steps which comprise introducing a reactant stream consisting essentially of dichloroethane in vapor phase into said pyrolysis zone, disposing a solid activating catalyst consisting essentially of graphite in said pyrolysis zone in substantially non-porous form, passing said dichloroethane through said pyrolysis zone and in contact with said non-porous catalyst therein, heating said pyrolysis zone and said catalyst and said dichloroethane therein to a temperature within the range of about 330°–600° C. effecting pyrolysis of said dichloroethane into a gas mixture including vinyl chloride and hydrogen chloride, collecting said pyrolysis gas mixture from said pyrolysis zone, separating hydrogen chloride and vinyl chloride therefrom, mixing unconverted dichloroethane with additional quantities of dichloroethane, and recycling said mixture through said pyrolysis zone.

References Cited by the Examiner
UNITED STATES PATENTS

| 2,588,867 | 3/1952 | Morris | 260—654 |
|---|---|---|---|
| 2,981,764 | 4/1961 | Bihan et al. | 260—656 |

FOREIGN PATENTS 633,211   12/1946   Great Britain.

LEON ZITVER, *Primary Examiner.*

K. H. JOHNSON, K. V. ROCKEY,
*Assistant Examiners.*